United States Patent Office 2,829,177
Patented Apr. 1, 1958

2,829,177
GUERBET CONDENSATION OF ALCOHOLS BY FERRIC NITRATE

Neville L. Cull and Joseph K. Mertzweiller, Baton Rouge, La., assignors to Esso Research and Engineering Company, a corporation of Delaware No Drawing. Application March 29, 1954
Serial No. 419,589

5 Claims. (Cl. 260—638)

The present invention relates to the condensation of alcohols to form alcohol products of higher molecular weight. More especially, the present invention relates to the condensation of alcohols having a methylene group adjacent to the hydroxylated carbon atom in the presence of an alkaline condensing agent.

It has long been known that alcohols of lower molecular weight may be condensed at relatively high temperatures in the presence of basic catalysts, such as sodium, sodium or potassium hydroxide or carbonate, or the sodium alcoholate into which these are converted, to form alcohols of higher molecular weight, in particular the dimer alcohol. By this condensation, known as the Guerbet reaction, suitable alcohols of lower molecular weight, and which have a methylene group adjacent to the hydroxylated carbon atom, are converted into alcohols containing twice the number of carbon atoms, in accordance with the following reaction:

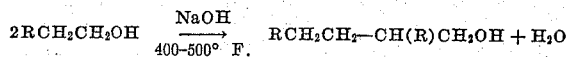

Concurrently, there is generally formed, in greater or smaller amounts, an acid corresponding in carbon atoms to the alcohol feed, in accordance with the well-known Dumas Stas reaction:

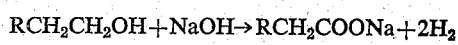

This reaction has been investigated by Weizmann, Bergmann and Haskelberg, Chemistry and Industry, 55, 587 (1937), and the theory developed there, as exemplified in the case of n-butanol, involves dehydrogenation of n-butanol to n-butyraldehyde catalyzed at high temperatures by the sodium alcoholate; thereafter, condensation of two molecules of n-butyraldehyde to form 2-ethyl-2-hexene-1 al; the reduction of this $\alpha,\beta$ unsaturated aldehyde to 2-ethyl hexanol-1, the hydrogen atoms for this hydrogenation being supplied by the concomittant Dumas-Stas reaction.

Reaction conditions generally include temperatures of from about 380 to 600° F., pressures of from atmospheric to 100 p. s. i. g., a ratio of condensing agent, such as caustic, to the alcohol of 1/100 to 1/8. It is generally desirable to allow for removal of water as it is formed in the reaction.

A particularly important source of primary alcohols which may be adapted to this reaction is that resulting from the reaction of $H_2$, CO and olefins in the presence of a carbonylation catalyst such as cobalt. In that reaction, an aldehyde product is initially formed, containing one more carbon atom than the olefin, under reaction conditions including temperatures of about 250–400° F. and pressures of 1500–4500 p. s. i. g. The aldehyde product is thereafter hydrogenated to the alcohol. This process, however, has certain limitations when it is attempted to prepare higher molecular weight alcohols from high molecular weight olefins. The amount of high molecular weight olefins available is limited. Also, it has been found that branch-chain high molecular weight olefins, having more than about 12 carbon atoms, are carbonylated with difficulty, yielding small amounts of alcohols, probably due to steric factors.

The use of the alcohol condensation reaction with the alcohol products produced by the carbonylation hydrogenation reaction would thus appear to be a particularly effective means for making high molecular weight primary alcohols which could not be produced directly from the aldehyde synthesis reaction for lack of suitable feed. Thus, moderately low molecular weight olefins of $n$ carbon atoms, such as those derived by polymerization of propylene and/or butylenes, and having up to 12 carbon atoms, could be converted to the corresponding $n+1$ primary alcohol, which then could be condensed by the alcohol condensation reaction to the $2n+2$ primary alcohol having 20 or more carbon atoms. These primary alcohols have high utility as intermediates for detergent manufacture and synthetic lubricants.

One of the problems associated with the alcohol condensation reaction is the inordinately long time required for it to come to completion or to equilibrium. Though this is noted even with relatively low molecular weight alcohols having up to 8 carbon atoms, the alkaline condensation of the higher molecular weight alcohols, such as those having 10 carbon atoms and higher, has been found to be an exceptionally slow reaction, requiring 24 to 72 hours for completion. The long maintenance of aldehyde product at the high reaction temperatures is conducive to product degradation and overall decrease in yield. Furthermore, increase in duration of reaction time is generally accompanied by increase in acid formation and increase in selectivity to the dimeric condensation product, the latter being generally the more desired end product.

This invention has as an object the development of a rapid process for the direct condensation of alcohols of lower molecular weight to produce alcohols of higher molecular weight, and particularly the condensation of primary alcohols of lower molecular weight possessing a methylene group next to the hydroxylated carbon atom to produce alcohols containing double the number of carbon atoms.

Another object of the present invention is to produce high molecular weight primary alcohols from olefins by combining sequentially an alcohol synthesis reaction with an alcohol condensation reaction.

A still further purpose and object of the present invention is to set forth a process for promoting the alkaline condensation reaction of alcohols with ionic promoters.

According to the present invention, it has now been surprisingly found that addition of certain ions to the solution of reagents has the effect of materially speeding up the alcohol condensation reaction, in particular in the condensation of alcohols having at least 10 carbon atoms. Since these alcohols are considerably less reactive than those of lower molecular weight, the invention is particularly well adapted to promoting the condensation of higher molecular weight alcohols.

It has been found that the addition of certain ions, in particular ferric ion $Fe^{++}$, reduces the reaction time of the condensate reaction almost threefold, at the same time being highly selective to the formation of the dimer alcohol. On the other hand, the addition of the metal or of the ferrous ion, $Fe^{++}$, had substantially no effect either on conversion level, reaction rate, or dimer alcohol selectivity.

In accordance with the present invention, therefore, lower aliphatic alcohols, particularly those having between 10–16 carbon atoms, and which are obtainable by the alcohol synthesis reaction, are reacted with a basic condensation catalyst, such as NaOH, at a temperature of about 380 to 600° F. with 0.1 to 0.5% by weight of the reaction promoter of the invention. The promoter may be added in the form of organic complexes but preferably as an inorganic salt.

The process of the present invention may be further illustrated by the following specific examples.

EXAMPLE I

In the series of determinations below, a liter of decyl alcohol prepared by the carbonylation of a $C_9$ polypropylene polymerizate fraction and subsequent hydrogenation of the aldehyde first formed was refluxed at atmospheric pressure with 11 grams NaOH dissolved in 20 grams $H_2O$ to provide an alcohol/caustic ratio of 20/1. After refluxing for 68 hours at a temperature of 380–425° F. in a round bottom flask equipped with reflux condenser and phase separator, a weight percent alcohol conversion of 61% was obtained, with 74% selectivity to $C_{20}$ alcohol.

Thereafter, under similar reaction conditions, the reaction was modified to include promoters as shown below in the table:

*Effect of metal ions on NaOH condensation of $C_{10}$ primary alcohols*

| Alc/NaOH | Promoter | Promoter, weight percent | Reaction time, hrs. | Conversion, weight percent | Selectivity to $C_{20}$ alcohols |
|---|---|---|---|---|---|
| 20/1 | None | | 48 | 57.6 | 72.3 |
| 20/1 | Steel filings | 10 | 48 | 56.6 | 74.4 |
| 20/1 | $Fe^{+++}$ as $Fe(NO_3)_3.9H_2O$ | 0.5 | 24 | 60.4 | 73.5 |
| 30/1 | $Fe^{+++}$ | 0.25 | 24 | 49.4 | 79.0 |
| 20/1 | $Fe^{++}$ as $FeSO_4.7H_2O$ | 0.25 | 24 | 36.2 | 39.0 |
| 20/1 | $Cu^{++}$ as $CuSO_4.5H_2O$ | 0.5 | 13 | 81.7 | 16.8 |
| 20/1 | $Cr^{+++}$ as $Cr(NO_3)_3.9H_2O$ | 0.5 | 24 | 42.0 | 60.3 |
| 20/1 | $Co^{+++}$ cobalt acetyl acetonate | .2 | 24 | 67.6 | 64.3 |
| 20/1 | $Co^{++}$ as $CoCl_2.6H_2O$ | .5 | 24 | 67.3 | 64.3 |
| 20/1 | $Mn^{++}$ $MnCl_2.4H_2O$ | .5 | 24 | 48.5 | 71.2 |

These results show clearly the great increase in reaction rates obtainable when ferric ion is added as a promoter to the alcohol condensation reaction. It is to be noted that neither the steel filings nor the ferrous ion have a comparable or, indeed, any promoting effect.

It is also to be noted that the cupric ion has a strong promoting effect different in kind from that of the ferric ion. The cupric ion not only gave very high alcohol conversion in a very short time, but also gave a 45.8% bottoms product (boiling above $C_{20}$ alcohol) of which 64% contained product boiling in the $C_{30}$ range. The saponification and acid number of this product indicated a high ester and acid content.

EXAMPLE II

It is surprising to find that the ferric ion, when added in the oil-insoluble form as $Fe(NO_3)_3.9H_2O$ promotes the condensation, whereas the addition of an oil-soluble compound such as ferric octanoate appears to inhibit the dimerization reaction completely. Cupric octanoate, however, appears to react in a manner similar to cupric sulfate. In the table below are compared the results obtained with these promoters at equivalent concentrations (0.5%) and at an alcohol/caustic mol ratio of 20/1.

| Promoter | $Fe(NO_3)_3.9H_2O$ | $Fe(octanoate)_3$ | $CuSO_4.5H_2O$ | $Cu(octanoate)_2$ |
|---|---|---|---|---|
| Reaction time (hrs.) | 24 | 24 | 13.5 | 8 |
| Product distribution, weight percent: | | | | |
| Monomer alcohol | 39.6 | 78.5 | 18.3 | 17.1 |
| Dimer alcohol | 44.5 | 0 | 13.7 | [1] 56.2 |
| Bottoms (425° F. at 20 mm.) | 14.1 | 18.3 | 45.8 | 16.6 |
| Weight percent alcohol conversion | 60.4 | 21.5 | 81.7 | 82.9 |

[1] 56.2% boiling in the $C_{20}$ alcohol cut range. However, laboratory inspection revealed large amounts of ester, aldehyde and acid.

The data reveal that:

(1) $Fe^{+++}$ added as ferric nitrate is effective as a promoter.

(2) $Fe^{+++}$ is not effective if added as ferric octanoate.

(3) $Fe^{++}$ is not effective.

(4) Upon washing the reaction product with water followed by dilute HCl (3%) the water and acid layer were green in color. Addition of excess HCl gave a deep blue organic layer. Indicates possible ferrous-ferric complexes.

(5) $Cr(NO_3)_3.9H_2O$ was ineffective in promoting condensation.

(6) $Cu^{++}$ gives a radially different product distribution.

The following conclusions are indicated.

(1) Ferric ion is essential—if the iron is too tightly bound by complex formation or if it is retained in the organic layer by using the iron salt of octanoic acid promotion does not occur.

(2) It would seem that there is a possibility of a redox mechanism involved between

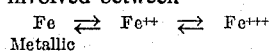

$$\text{Fe} \rightleftarrows \text{Fe}^{++} \rightleftarrows \text{Fe}^{+++}$$
Metallic (3) The reaction with iron salts differs from that of a strictly hydrogenation-dehydrogenation promoter in that (1) $Cu^{++}$ is apparently rapidly reduced to metallic Cu which promotes condensation but selectivity to dimer alcohol is poor. The product distribution is entirely changed and acids, esters and aldehydes in addition to alcohol are formed in large amounts.

(2) $Cr^{+++}$ added as $Cr(NO_3)_3.9H_2O$ and $MoO_3$ while both good hydrogenation-dehydrogenation catalysts do no appreciably promote the condensation.

(3) Metallic iron as such is not effective, e. g., the 18–8 stainless steel filings added in amounts as high as 10 wt. percent failed to promote the condensation.

(4) Apparent some type of (a) an ionic complex catalyzed oxidation reduction mechanism is involved or (b) a sodium ferrate is formed which is more efficient as a condensation catalyst than the NaOH.

Supporting the redox possibility are—

(1) Colors obtained in water layer after washing and acidifying the reaction product indicate possible ferrous-ferric complexes.

(2) Inactivity of the ferric octanoate. This salt may be more stable toward reduction.

Supporting the sodium ferrate possibility are—

(1) $Fe(NO_3)_3$ would be water soluble and since 50% NaOH was used could have a high concentration of $Fe^{+++}$ in the alkali layer.

(2) Ferric octanoate would be more soluble in the organic layer and thus the chance of forming a ferrate compound would be greatly reduced.

Though the illustrative examples have been used to illustrate the increase in reaction rate with a decyl alcohol, the invention is not restricted thereto. Valuable condensation products have been prepared by applying the reaction to other alcohols, particularly those derived from olefins and prepared by the carbonylation reaction. Thus, isooctyl alcohol derived from heptene has been converted to the $C_{16}$ alcohol and tridecyl alcohol derived from a $C_{12}$ polypropylene fraction converted to a $C_{26}$ primary alcohol. The alcohols thus prepared were characterized as follows:

| | $C_{16}H_{33}OH$ | $C_{20}H_{41}OH$ | $C_{26}H_{53}OH$ |
|---|---|---|---|
| Gravity, ° API | 35.3 | 35.1 | |
| Refractive index | 1.4475 | 1.4538 | 1.4594 |
| Boiling range, ° F | 330–360 at 20 mm. Hg. | 390–425 at 20 mm. Hg. | 465–500 at 20 mm. Hg. |
| Hydroxyl number | 228 (231) | 188 (188) | 131 (147) |

Numbers in parentheses are the theoretical values.

What is claimed is:

1. In the process wherein alcohols having at least one hydrogen atom attached to the same carbon atom as the hydroxyl group and having a methylene group adjacent to said carbon atom are condensed at elevated temperatures with an alkali metal condensation agent to produce an alcohol product having twice the number of carbon atoms as said original alcohol, the improvement which comprises carrying out said reaction in the presence of said alkali metal condensation agent and ferric nitrate in a liquid reaction mixture of the alcohol.

2. An improved process for preparing high molecular weight primary alcohols having more than 10 carbon atoms which comprises heating and reacting a primary alcohol in the presence of an alkali metal condensation agent at a temperature of about 400–500° F. and in the presence of ferric nitrate in a liquid reaction mixture of the primary alcohol being condensed.

3. The process of claim 2 wherein said reaction is carried out in the presence of a sodium hydroxide condensing agent and the ferric nitrate.

4. An improved process for preparing primary alcohols of high molecular weight containing $2n+2$ carbon atoms from olefins having $n$ carbon atoms, where $n$ is a number higher than 6, which comprises reacting said olefin with CO, $H_2$ and a cobalt catalyst at elevated temperatures and pressures to produce an aldehyde product having $n+1$ carbon atoms, hydrogenating said aldehyde to the corresponding alcohol, and condensing said alcohol with an alkali metal condensation agent and $Fe(NO_3)_3 \cdot 9H_2O$ in a liquid reaction of said alcohol.

5. The process of claim 4 wherein said high molecular weight alcohol has at least 16 carbon atoms.

References Cited in the file of this patent

UNITED STATES PATENTS

| 1,992,480 | Fuchs et al. | Feb. 26, 1935 |
| 2,092,450 | Fuchs et al. | Sept. 7, 1937 |
| 2,457,866 | Carter | Jan. 4, 1949 |

FOREIGN PATENTS

| 478,141 | Great Britain | Jan. 13, 1938 |
| 876,589 | France | Nov. 10, 1942 |